(12) United States Patent
Driscoll et al.

(10) Patent No.: US 11,652,663 B1
(45) Date of Patent: May 16, 2023

(54) CONTROLLER AREA NETWORK BRAIDED RING

(71) Applicant: Honeywell International Inc., Charlotte, NC (US)

(72) Inventors: Kevin Raymond Driscoll, Maple Grove, MN (US); Brendan Hall, Eden Prairie, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/588,037

(22) Filed: Jan. 28, 2022

(51) Int. Cl.
*H04L 12/40* (2006.01)
*H04L 12/42* (2006.01)

(52) U.S. Cl.
CPC .. *H04L 12/40071* (2013.01); *H04L 12/40013* (2013.01); *H04L 12/40058* (2013.01); *H04L 12/40195* (2013.01); *H04L 12/42* (2013.01); *H04L 2012/40215* (2013.01); *H04L 2012/40273* (2013.01)

(58) Field of Classification Search
CPC ......... H04L 12/40071; H04L 12/40013; H04L 12/40058; H04L 12/40195; H04L 2012/40215; H04L 2012/40273
See application file for complete search history.

(56) References Cited

U.S. PATENT DOCUMENTS

| | | | |
|---|---|---|---|
| 6,414,941 B1 * | 7/2002 | Murakami | H04L 12/433 370/452 |
| 7,372,859 B2 | 5/2008 | Hall et al. | |
| 7,502,334 B2 | 3/2009 | Hall et al. | |
| 7,505,470 B2 | 3/2009 | Hall et al. | |
| 7,606,179 B2 | 10/2009 | Hall et al. | |
| 7,649,835 B2 | 1/2010 | Hall et al. | |
| 7,656,881 B2 | 2/2010 | Hall et al. | |
| 7,729,297 B2 | 6/2010 | Hall et al. | |
| 7,778,159 B2 | 8/2010 | Driscoll et al. | |
| 7,783,808 B2 | 8/2010 | Hall et al. | |

(Continued)

FOREIGN PATENT DOCUMENTS

| | | |
|---|---|---|
| EP | 2139172 A1 | 12/2009 |
| EP | 3668020 A1 | 6/2020 |

OTHER PUBLICATIONS

"Brendan Hall et al., FlexRay BRAIN Fusion A FlexRay-Based Braided Availability Integrity Network, 2007, Journal of Passenger Cars: Electronic and Electrical System, vol. 116 Section 7, pp. 460-473".*

(Continued)

*Primary Examiner* — Rasheed Gidado
(74) *Attorney, Agent, or Firm* — Fogg & Powers LLC

(57) ABSTRACT

Systems and methods for a controller area network braided ring are provided. In certain embodiments, a node within a controller area network braided ring includes a controller area network (CAN) controller that transmits and receives CAN messages according to CAN protocol. The node also includes braided ring availability integrity network (BRAIN) circuitry coupled to the CAN controller, wherein the BRAIN circuitry alters the received CAN messages from the CAN controller for transmission to other nodes within a BRAIN network and alters BRAIN messages received from the other nodes into CAN messages for processing by the CAN controller.

20 Claims, 7 Drawing Sheets

(56) References Cited

U.S. PATENT DOCUMENTS

| | | | |
|---|---|---|---|
| 7,889,683 | B2 | 2/2011 | Paulitsch et al. |
| 7,912,094 | B2 | 3/2011 | Hall et al. |
| 8,130,773 | B2 | 3/2012 | Hall et al. |
| 8,265,100 | B2 | 9/2012 | Steiner et al. |
| 8,339,993 | B2 | 12/2012 | Paulitsch et al. |
| 8,665,882 | B2 | 3/2014 | Hall et al. |
| 8,767,767 | B2 | 7/2014 | Driscoll et al. |
| 8,817,597 | B2 | 8/2014 | Hall et al. |
| 8,908,675 | B2 | 12/2014 | Hall et al. |
| 10,051,040 | B2 * | 8/2018 | Marvin .............. B66B 1/3446 |
| 2008/0063006 | A1 | 3/2008 | Nichols |
| 2009/0323704 | A1 * | 12/2009 | Hall .................. H04L 12/4625 |
| | | | 370/401 |
| 2016/0173325 | A1 | 6/2016 | Woodward et al. |

OTHER PUBLICATIONS

Hall, Brendan et al., "Dual Fault-Tolerant Network Using Guardian Interlocking", U.S. Appl. No. 16/600,385, filed Oct. 11, 2019, pp. 1-53, Published: US.
Hall, Brendan et al., "Efficient Self-Checking Redundancy Comparison in a Network", U.S. Appl. No. 16/600,390, filed Oct. 11, 2019, pp. 1-51, Published: US.
European Patent Office, "Extended European Search Report", from EP Application No. 23150797.1, from Foreign Counterpart to U.S. Appl. No. 17/588,037, filed Feb. 16, 2023, pp. 1 through 8, Published: EP.

* cited by examiner

CONTROLLER AREA NETWORK BRAIDED RING

BACKGROUND

The Controller Area Network (CAN) protocol (ISO 11898) is flexible and easy to deploy in distributed embedded systems. The CAN protocol has been widely used in various industries. For example, in the automotive industry, the CAN protocol is the de-facto network standard for automotive applications. Since its initial deployment in the late 1980s, the simple low-cost bus topology and inherent flexibility of the CAN protocol has led to its adoption in the majority of low-to-medium speed networking traffic. Today, most automotive engine control units (ECU) have some form of connection to a CAN network, and most automotive-centric semiconductors have at least one integrated CAN controller.

Currently, however, CAN implementations do not meet evolving safety and security requirements. In particular, CAN implementations struggle to meet availability requirements. For example, in some implementations, to provide the desired availability, an entire network would have to be duplicated or triplicated. However, duplication and/or triplication are not conducive to common design goals of low size, weight, power, and cost.

SUMMARY

Systems and methods for a controller area network braided ring are provided. In certain embodiments, a node within a controller area network braided ring includes a controller area network (CAN) controller that transmits and receives CAN messages according to CAN protocol. The node also includes braided ring availability integrity network (BRAIN) circuitry coupled to the CAN controller, wherein the BRAIN circuitry alters the received CAN messages from the CAN controller for transmission to other nodes within a BRAIN network and alters BRAIN messages received from the other nodes into CAN messages for processing by the CAN controller.

DRAWINGS

Understanding that the drawings depict only some embodiments and are not therefore to be considered limiting in scope, the exemplary embodiments will be described with additional specificity and detail using the accompanying drawings, in which.

Figure 6:
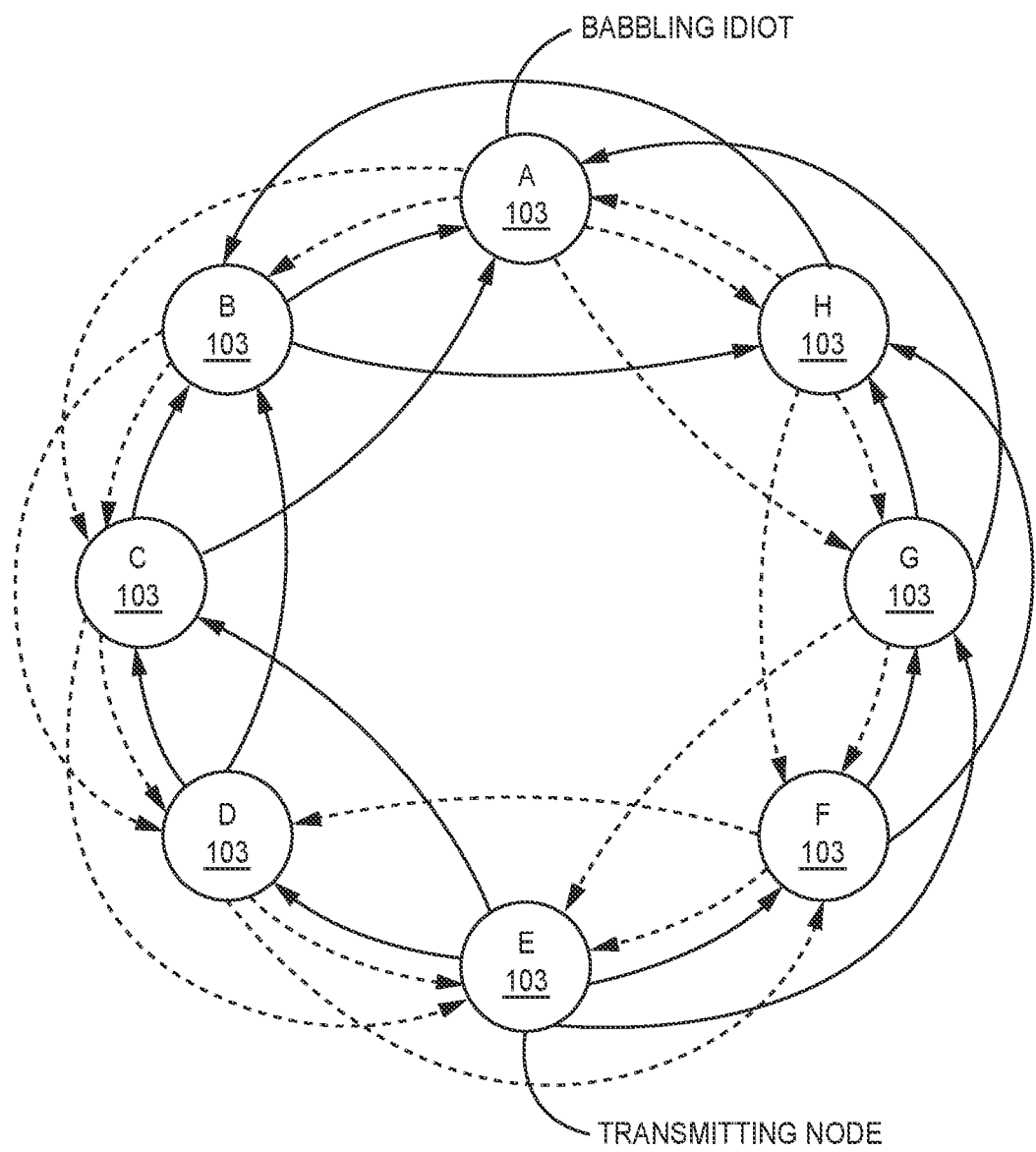
Figure 7:
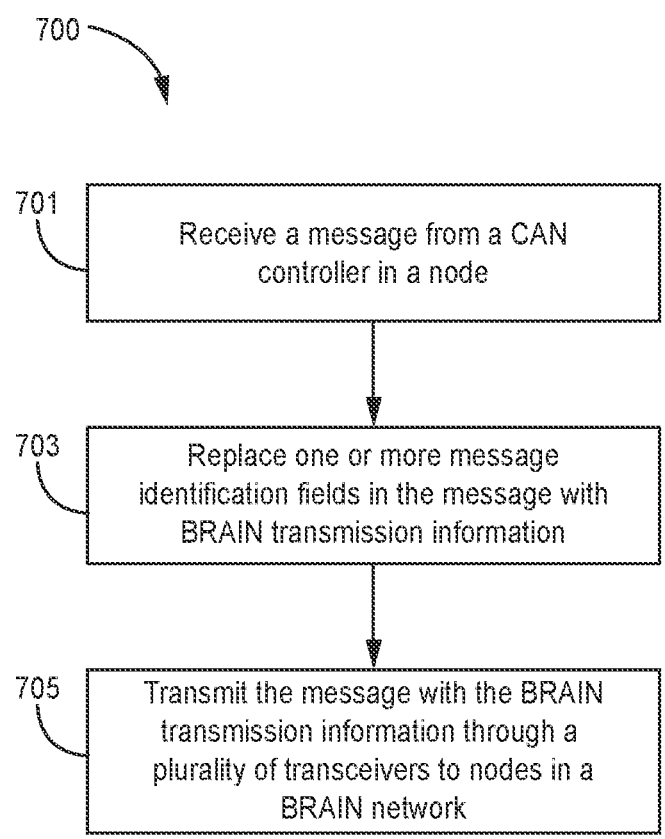

FIG. 6 is a flowchart diagram illustrating an exemplary network having a braided ring topology where a node in the network is experiencing a babbling idiot fault according to an aspect of the present disclosure; and FIG. 7 is a flow chart diagram illustrating an exemplary method for altering CAN messages for transmission in a braided ring availability integrity network according to an aspect of the present disclosure.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made.

Embodiments described herein provide systems and methods for a controller area network (CAN) braided ring availability integrity network (BRAIN). In particular, systems described herein implement communication nodes that communicate with one another according to a modified version of the CAN protocol, where the communication nodes are arranged in a BRAIN topology. Accordingly, the CAN-BRAIN system may provide dependability that is desired by evolving safety and security requirements while still being compatible with the CAN protocol. Thus, systems described herein may provide safety and security while using existing CAN components, test equipment, and other support infrastructure.

Figure 1:
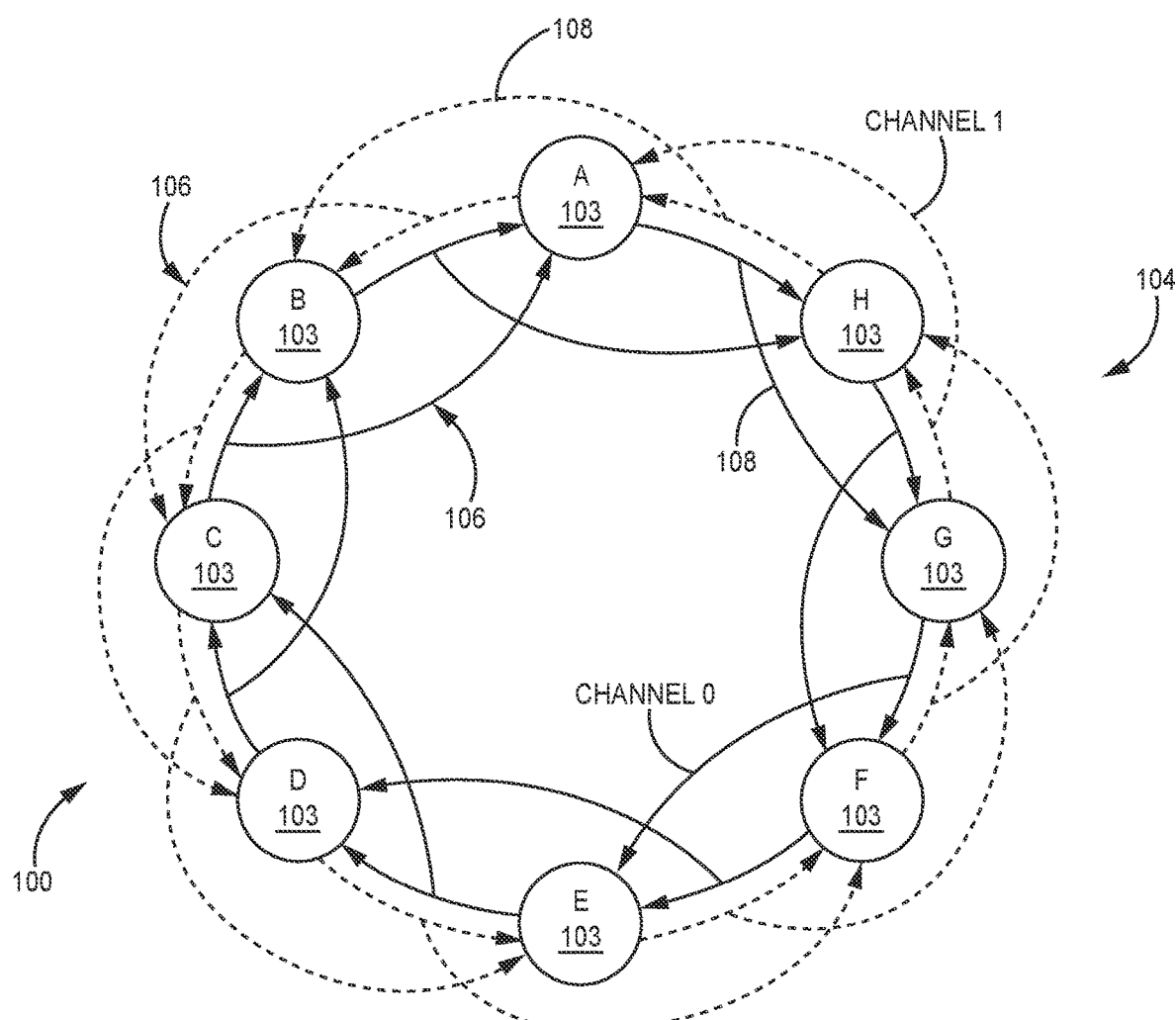
FIG. 1 is a block diagram illustrating an exemplary network having a braided ring topology according to an aspect of the present disclosure.

FIG. 1 is a block diagram of one embodiment of a BRAIN network 100 where BRAIN network 100 is a communication network where the nodes are arranged according to a BRAIN topology. For example, the BRAIN network 100 may include multiple nodes 103. Each node 103 of the BRAIN network 100 may be communicatively coupled to at least one channel 106. For a given direction in which data flows in the channel 106, the channel 106 directly (that is, with only one hop) communicatively couples each node 103 to at least two other nodes 103 from which that node 103 receives data (also referred to herein as "receive-from nodes") and to at least two other nodes 103 to which that node 103 transmits data (also referred to herein as the "transmit-to nodes"). In one embodiment, one of the received-from nodes 103 is designated as a "primary" receive-from node 103 and the other received from nodes 103 are designated as "secondary" receive-from nodes 103. When a node 103 "relays" data on a channel 106 in a given direction, that node 103 receives data from the primary receive-from node 103 for that channel 106 in that direction and forwards the received data along the same channel to each of the transmit-to nodes designated for that node 103 for that channel 106 and that direction. Data received by a node 103 from the secondary receive-from nodes 103 is used for the various comparison operations described below and/or is related in the event that suitable data is not received from the primary receive-from node. When a given node 103 "transmits" data (that is, when the given node 103 is the source of data communicated on the BRAIN network 100) along a channel 106 in a given direction, that node 103 transmits the data to each of the transmit-to nodes 103 designated for that node 103 for that channel 106 and direction.

In the particular embodiment shown in FIG. 1, the nodes 103 are arranged in a ring 104 having a "braided ring"

topology in which the nodes 103 communicate with one another over multiple communication channels 106. In particular embodiments shown in FIG. 1, eight nodes 103 communicate with one another over two replicated communication channels 106. In other embodiments, a different number and/or type of nodes 103 and/or channels 106 may be used.

The eight nodes 103 shown in FIG. 1 are also individually labeled in FIG. 1 with the letters A through H and are referred to herein individually as "node A," "node B," and so forth. As used herein, "neighbor node" (or just "neighbor") is a node 103 that is immediately next to a given node 103 in the ring 104. Each node 103 has two "neighbor nodes" 103, one neighbor node in the clockwise direction (also referred to herein as the "clockwise neighbor node" or "clockwise neighbor") and one in the counter-clockwise direction (also referred to herein as the "counter-clockwise neighbor node" or "counter-clockwise neighbor"). For example, the neighbor nodes 103 for node A are node H in the clockwise direction and node B in the counterclockwise direction. While the terms clockwise and counterclockwise are used, these terms are relative terms that are intended to indicate different communication directions from a node 103 with other nodes 103 within the BRAIN network 100.

In addition, as used herein, a "neighbor's neighbor node" (or just "neighbor's neighbor") for a given node 103 is the neighbor node 103 of the neighbor node 103 of the given node 103. Each node 103 has two neighbor's neighbor nodes 103, one in the clockwise direction (also referred to herein as the "clockwise neighbor's neighbor node" or "clockwise neighbor's neighbor") and one in the counter-clockwise direction (also referred to herein as the "counter-clockwise neighbor's neighbor node" or "counter-clockwise neighbor's neighbor"). For example, the two neighbor's neighbor nodes for node A are node G in the clockwise direction and node C in the counterclockwise direction.

As used herein, when a link 108 is described as being connected "from" a first node 103 "to" a second node 103, the link 108 provides a communication path for the first node 103 to send data to the second node 103 over the link 108. That is, the direction of that unidirectional link 108 is from the first node 103 to the second node 103.

A link 108 is connected from each node 103 to that node's clockwise neighbor node 103. A link 108 is also connected from each node 103 to that node's clockwise neighbor's neighbor node 103. For example, a link 108 is connected from node A to node H and a link 108 is connected from node A to node G. These clockwise links 108 make up channel 0 and are shown in FIG. 1 using solid lines.

A link 108 is connected from each node 103 to that node's counterclockwise neighbor node 103. A link 108 is also connected from each node 103 to that node's counterclockwise neighbor's neighbor node 103. For example, a link 108 is connected from node A to node B and a link 108 is connected from node A to node C. These counterclockwise links 108 make up channel 1 and are shown in FIG. 1 using dashed lines.

The links 108 that connect a given node 103 to that node's respective clockwise and counterclockwise neighbor nodes 103 are also referred to herein as "near" links 108. The links 108 that connect a given node 103 to that node's respective clockwise and counterclockwise neighbor's neighbors are referred to here as "skip" links 108.

In the particular embodiment shown in FIG. 1, for channel 0, the receive-from nodes 103 for each node 103 are that node's counter-clockwise neighbor and counter-clockwise neighbor's neighbor and the transmit-to nodes 103 for each node 103 are that node's clockwise neighbor and clockwise neighbor's neighbor. In the embodiments described herein, the primary receive-from node 103 is each node's counter-clockwise neighbor (though in other embodiments, the primary receive-from node 103 is the node's counter-clockwise neighbor's neighbor). In the particular embodiment shown in FIG. 1, for channel 1, the receive-from nodes 103 for each node 103 are that node's clockwise neighbor and clockwise neighbor's neighbor and the transmit-to nodes 103 for each node 103 are that node's counter-clockwise neighbor and counter-clockwise neighbor's neighbor. In the embodiments described herein, the primary receive-from node 103 is each node's clockwise neighbor (though in other embodiments, the primary receive-from node 103 is the node's clockwise neighbor's neighbor).

In the particular embodiment shown in FIG. 1, the BRAIN network 100 is implemented as a peer-to-peer network in which each transmission is intended to be received by each node 103 of the BRAIN network 100. In other embodiments, each transmission is intended for a particular destination node. Moreover, in the embodiments described herein, data may be communicated in the BRAIN network 100 in the form of frames of data though it is to be understood that, in other embodiments, other units of data are communicated over the BRAIN network 100.

In additional embodiments, neighboring nodes 103 may form self-checking pairs. Additional information regarding self-checking pairs can be found in U.S. Pat. No. 7,372,859, which is hereby incorporated herein by reference. Further, the node 103 may also compare the hop counts, as described below, to qualify the source of the received frames in order to select which link to use as the default link.

For example, in some embodiments, the primary receive-from link is the skip link. However, if after comparing the frames received on the skip and near links of both channels, it is determined that the frame forwarded from the primary receive-from link for a given channel does not match the frames received on the other channel and the frame from the non-selected link does match the frames from the other channel, the node 103 sets the non-selected link as the default or primary receive-from link for future received frames. In this way a faulty link or node 103 can be isolated in future transmissions.

In addition, in some embodiments, a hop count is added to forwarded frames to aid in identifying faults. For example, each of the receiving nodes is configured to increment a hop-count field in the message data transmitted from the sending nodes 103 (e.g., nodes B and C in this example) prior to forwarding the received data to other nodes 103. In addition, each receiving node 103 compares the incremented hop count of the data received over channel 1 to the incremented hop count of the data received over channel 0 in order to qualify the self-checking pair action of a self-checking pair. In other words, the hop count may be used by each of the receiving nodes 103 to detect if one of the nodes 103 in the self-checking pair is masquerading as a pair which could compromise the directional integrity of the data if the single node 103 is transmitting different data on each channel. In addition, the hop count is not limited to detecting a self-checking pair masquerade but can be used to detect other masquerading node faults.

In particular, each receiving node 103 may perform a calculation using a hop count from each channel and may compare the result of the calculation to one or more allowed values. In particular, the allowed values may include the total number of nodes, N, in the network or the total number of nodes minus one (N−1). For example, in one embodiment, the sending nodes 103 (node C and B in this example) of the self-checking pair are each configured to set the initial hop count to zero. Each receiving node 103 is configured to increment the hop count for the respective link over which the data is received. For example, in this embodiment, the receiving nodes 103 are configured to increment the hop count of messages received over near links by "1" and to increment the hop count of messages received over skip links by "2". After incrementing the hop count, each receiving node 103 sums the hop count from channel 1 with the hop count from channel 0. If the sum of the hop count does not equal N−1, the receiving node 103 determines that a fault has occurred.

It is to be understood that other calculations or variations of the calculations described above can be used in other embodiments. For example, in some embodiments, each receiving node 103 is configured to increment the hop count received over the near links 108 by "2" and to increment the hop count received over the skip links by "4". In other embodiments, the initial hop count is set to zero on one channel and to the total number of nodes, N, on the other channel. In such embodiments, each receiving node 103 is configured to increment the hop count for the channel having an initial value of zero and to decrement the hop count for the channel having an initial value equal to N. Accordingly, the hop count may be used to determine that a fault has occurred.

In certain embodiments, the nodes 103 in the BRAIN network 100 may be nodes 103 that communicate with one another based on the CAN protocol. Accordingly, by using a BRAIN network 100, CAN nodes 103 may communicate with one another within the BRAIN network 100 while meeting safety and security requirements for different implementations.

Figure 2:
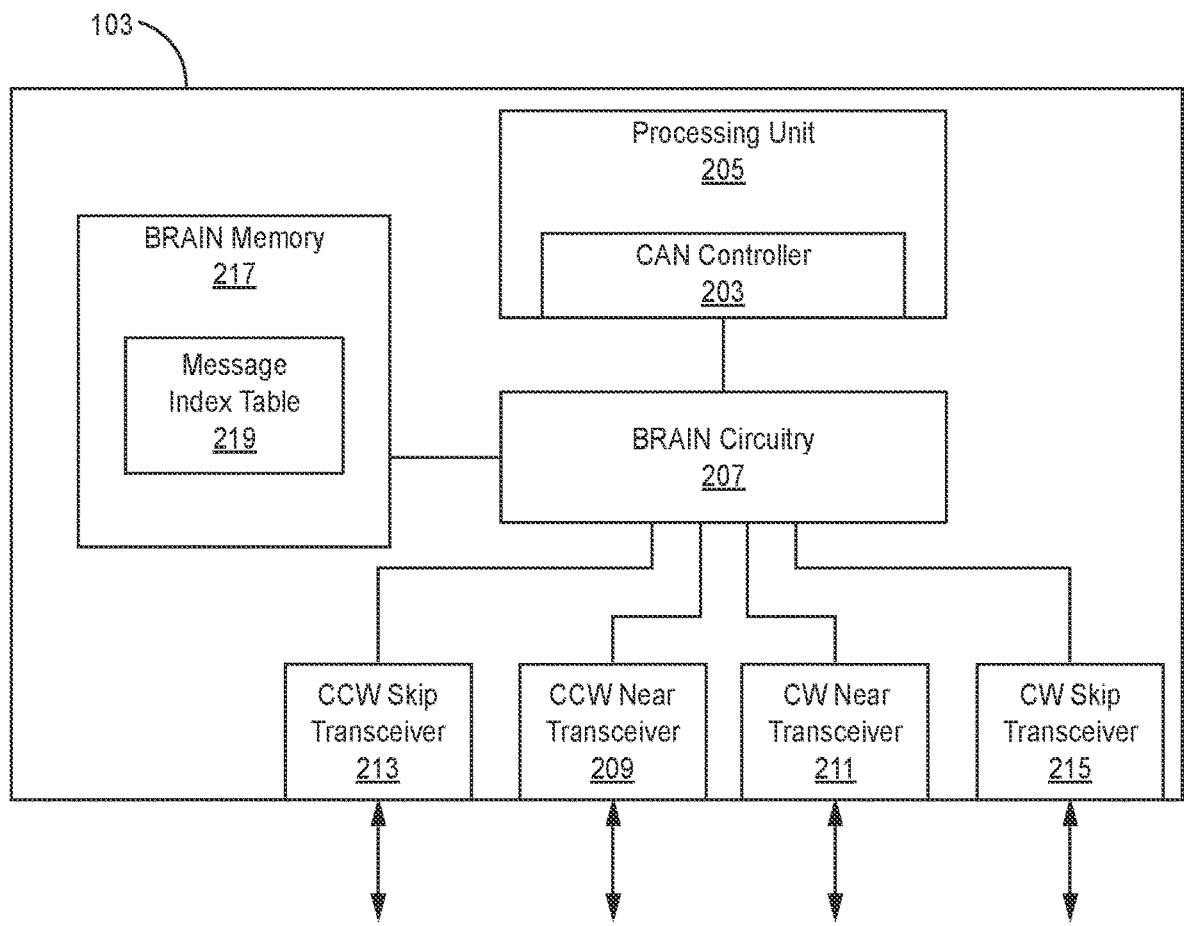
FIG. 2 is a block diagram illustrating an exemplary node within a braided ring availability integrity network according to an aspect of the present disclosure.

FIG. 2 is a block diagram that illustrates the different components of a node 103, where a node 103 can communicate with other nodes based on the CAN protocol where the node 103 communicates with the other nodes 103 within a BRAIN network 100. As illustrated, the node 103 may include components that facilitate the communication of messages according to the CAN protocol while also including components that allow multiple nodes 103 to communicate with one another in a BRAIN topology.

In certain embodiments, the node 103 may include a processing unit 205. In some implementations the processing unit 205 may function as a host processor for the node 103. When the processing unit 205 functions as a host processor, the processing unit 205 may determine the meaning of received messages and determine the information to be transmitted to other nodes 103 from the node 103. Further, the processing unit 205 may be connected to other devices such as sensors, actuators, and/or control devices and may facilitate communication of the other devices through the BRAIN network 100.

The processing unit 205 or other computational devices used to facilitate communication through the BRAIN network 100 may be implemented using software, firmware, hardware, or any appropriate combination thereof. The processing unit 205 and other computational devices may be supplemented by, or incorporated in, specially-designed application-specific integrated circuits (ASICs) or field programmable gate arrays (FPGAs). The processing unit 205 and other computational devices can also include or function with software programs, firmware, or other computer readable instructions for carrying out various process tasks, calculations, and control functions used in the present methods and systems.

The present methods may be implemented by computer executable instructions, such as program modules or components, which are executed by the processing unit 205 or other processing units. Generally, program modules include routines, programs, objects, data components, data structures, algorithms, and the like, which perform particular tasks or implement particular abstract data types.

Suitable computer readable storage media may include, for example, non-volatile memory devices including semiconductor memory devices such as random access memory (RAM), read only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs; or other media that can be used to carry or store desired program code in the form of computer executable instructions or data structures.

In certain embodiments, the node 103 may also include a CAN controller 203. As shown, executable instructions and functions associated with the CAN controller 203 may be performed by the processing unit 205. Alternatively, the instructions and functions associated with the CAN controller 203 may be performed by another processing unit in communication with the processing unit 205. As described herein, the CAN controller 203 may control the reception and transmission of messages based on the CAN protocol. For example, the CAN controller 203 may store received message bits from the BRAIN network 100 until the CAN controller 203 receives an entire message. Upon the reception of a full message, the CAN controller 203 provides the message to the processing unit 205. When transmitting a message, the processing unit 205 may provide a message for transmission through the BRAIN network 100 to the CAN controller 203. The CAN controller 203 may then provide the bits for transmission on the BRAIN network 100.

Instructions for carrying out the various process tasks, calculations, and generation of other data used in the operation of the methods described herein may be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

In additional embodiments, the node 103 may also include multiple transceivers for communicating with other nodes 103 in the BRAIN network 100. As described herein, the transceivers may function in a similar manner to a typical CAN transceiver. For example, a transceiver may receive a data stream from the BRAIN network 100 and may convert the data stream to levels that are usable by the CAN controller 203. Additionally, the transceivers may include circuitry that protects other circuitry within the node 103. When transmitting, the transceivers may convert the data stream to energy levels conducive for communicating with other nodes 103 through the BRAIN network 100.

As illustrated, the node 103 may include separate transceivers for communicating with the other nodes 103 within the BRAIN network 100. In some embodiments, the node 103 may include four separate transceivers. For example, the node 103 may include a counter-clockwise near transceiver 209, a clockwise near transceiver 211, a counter-clockwise skip transceiver 213, and a clockwise skip transceiver 215. The counter-clockwise near transceiver 209 may be connected to a near link that connects the node 103 with a counter-clockwise neighbor node 103. Additionally, the clockwise near transceiver 211 may be connected to a near link that connects the node 103 with a clockwise neighbor node 103. Also, the counter-clockwise skip transceiver 213 may be connected to a skip link that connects the node 103 with a counter-clockwise neighbor's neighbor node 103. Moreover, the clockwise skip transceiver 215 may be connected to a skip link that connects the node 103 with a clockwise neighbor's neighbor node 103.

In certain embodiments, to facilitate the communication of messages between the node 103 and other nodes within the BRAIN network 100, the node 103 may include BRAIN circuitry 207. As used herein, the BRAIN circuitry 207 may refer to circuitry that interfaces the transceivers with the CAN controller 203 to facilitate the transmission and reception of CAN messages by the CAN controller 203 through the BRAIN network 100. In particular, the CAN controller 203 may transmit messages according to the CAN protocol that are received by the BRAIN circuitry 207. The BRAIN circuitry may also receive messages from other nodes through the BRAIN network 100 and the transceivers and adapt them for reception according to the CAN protocol for use by the CAN controller 203. In certain embodiments, the BRAIN circuitry 207 may exist in the same processing device as the CAN controller 203. Alternatively, the BRAIN circuitry 207 may operate on a separate processing device.

In some embodiments, the BRAIN circuitry 207 may replace fields that are not necessary for communication within the BRAIN network 100 in the transmitted message with other information that facilitates communication within the BRAIN network 100. For example, the CAN protocol may call for the transmission of message identification and may provide a field within a data frame that facilitates the transmission of the message identification information. However, when communicating through a BRAIN network, the message identification information is not necessary. However, other information such as table index information and hop count may aid in the communication of messages transmitted through the BRAIN network 100. Accordingly, the BRAIN circuitry may replace the message identification with information regarding the table index and the hop count. Additionally, the BRAIN circuitry 207 may replace other fields with information that may aid in the communication of data through the BRAIN network 100.

In additional embodiments, when the node 103 receives a message from the BRAIN network 100, through one of the data transceivers, the BRAIN circuitry may replace the information within the data frame that facilitates communication within the BRAIN network 100 with information call for in the CAN protocol. Accordingly, the transmission and reception of messages may appear to the CAN controller 203 as if the messages are sent and received through a typical CAN network. For example, where the BRAIN circuitry removes message identification information from frames that are transmitted by the node 103 with table index information and a hop count, the BRAIN circuitry 207 may use the table index information and hop count within a received message to calculate message identification information and replace the table index information and hop count with the message identification information.

In some embodiments, the node 103 may include a BRAIN memory 217. The BRAIN memory 217 may store data on a computer readable storage media within the node 103, where the computer readable storage media may be similar to the computer readable storage media described above in connection with the processing unit 205. However, while the BRAIN memory 217 may be located in the node 103, the BRAIN memory 217 may be accessible to only the BRAIN circuitry 207. Accordingly, a node 103 may include multiple storage devices, where one or more storage devices are accessible to the processing unit and one or more storage devices are dedicated for use as the BRAIN memory 217. Alternatively, a storage device may be partitioned such that a partition on the storage device is accessible to the processing unit 205 and other devices within the node 103.

In further embodiments, the BRAIN memory 217 may store a message index table. As used herein, the message index table may refer to a data structure stored within the BRAIN memory 217 that associates a message identification number with an index number. Additionally, the different nodes 103 within the BRAIN network 100 may store separate versions of the message index table 219. Accordingly, when a message is transmitted through the different nodes 103 in the BRAIN network 100, the BRAIN circuitry 207 may use a table index number contained within the transmitted data frame to find the desired message identification. The BRAIN circuitry 207 may replace the table index number and the hop count within the data frame with the message identification acquired within the message index table 219. When the message identification is placed within the data frame, the BRAIN circuitry 207 may provide the message to the CAN controller 203. Conversely, when a message is to be transmitted from the CAN controller 203 through the BRAIN network 100, the BRAIN circuitry may identify the table index number within the message index table 219 to replace the message identification in the data frame provided by the CAN controller 203.

In additional embodiments, the BRAIN circuitry 207 may use information describing the transceivers through which the messages are transmitted and received to increase the hop count for received messages. As described above, the hop count may refer to the number of nodes 103 through which a particular message has passed through or skipped within the BRAIN network 100. When a node 103 receives a message, depending on the transceiver through which the message was received, the BRAIN circuitry 207 within the node 103 may increase the hop count for the message by either one or two. For example, when a node 103 receives a message through either the counterclockwise skip transceiver 213 or the clockwise skip transceiver 215, the BRAIN circuitry 207 on the node 103 may increment the hop count by two. Alternatively, when the node 103 receives a message through either the counterclockwise near transceiver 209 or the clockwise near transceiver 211, the BRAIN circuitry 207 on the node 103 may increment the hop count by one. The BRAIN circuitry 207 may use the hop count to determine whether or not faults have occurred at particular nodes 103.

In certain embodiments, the BRAIN circuitry 207 may increment the hop count using a serial one-bit adder. Typically, a serial one bit adder takes in two numbers and a carry and produces a sum and a carry. However, as the BRAIN circuitry 207 increments a single value, the serial one bit adder receives a single number, the hop count. To increment the hop count, the BRAIN circuitry 207 presets the carry based on the transceiver that provided the message associated with the hop count to the BRAIN circuitry 207 and adds a zero to the hop count. For example, if the message is received through the counterclockwise near transceiver 209 or the clockwise near transceiver 211, the BRAIN circuitry 207 may preset the carry to one. Accordingly, when the carry is added to the hop count along with the zero, the adder increments the hop count by one. Alternatively, if the message is received through the counterclockwise skip transceiver 213 or the clockwise skip transceiver 215, the BRAIN circuitry 207 may preset the carry for the first bit to zero but preset the carry for the second bit to one. Accordingly, when the carries are added to the hop count along with the zero, the adder may increment the hop count by two. By using serial adders, the BRAIN circuitry 207 may reduce the propagation delay for the incrementing of the hop count through the node 103.

Accordingly, by placing the BRAIN circuitry 207 between the CAN controller 203 and the transceivers; CAN components, test equipment, and other CAN support infrastructure may take advantage of the benefits provided by the BRAIN network 100. In particular, the BRAIN circuitry 207 may provide for a low size, weight, power, and cost data network through which the CAN components may communicate while meeting safety and/or security critical requirements.

Figure 3:
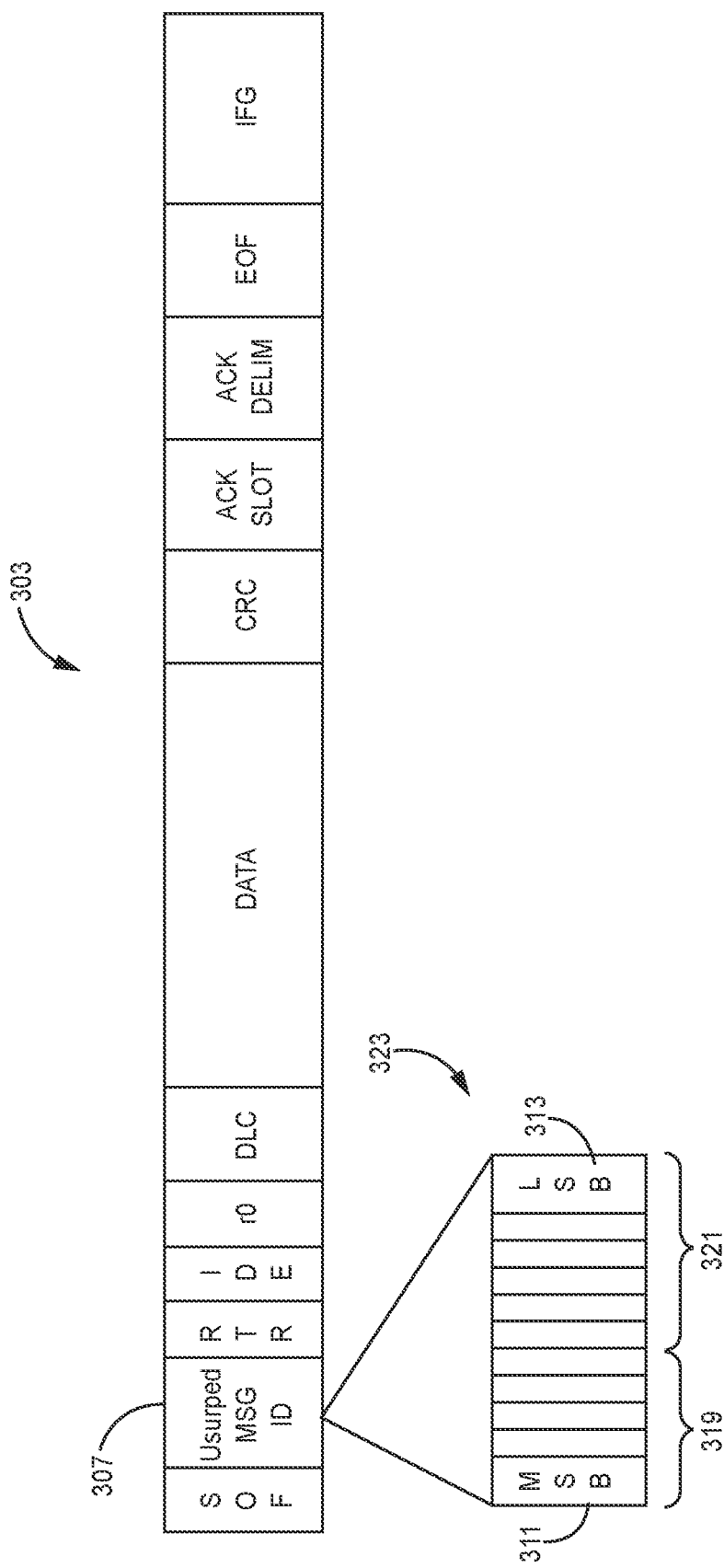
FIG. 3 is a block diagram illustrating an exemplary message frame according to an aspect of the present disclosure.
Figure 4:
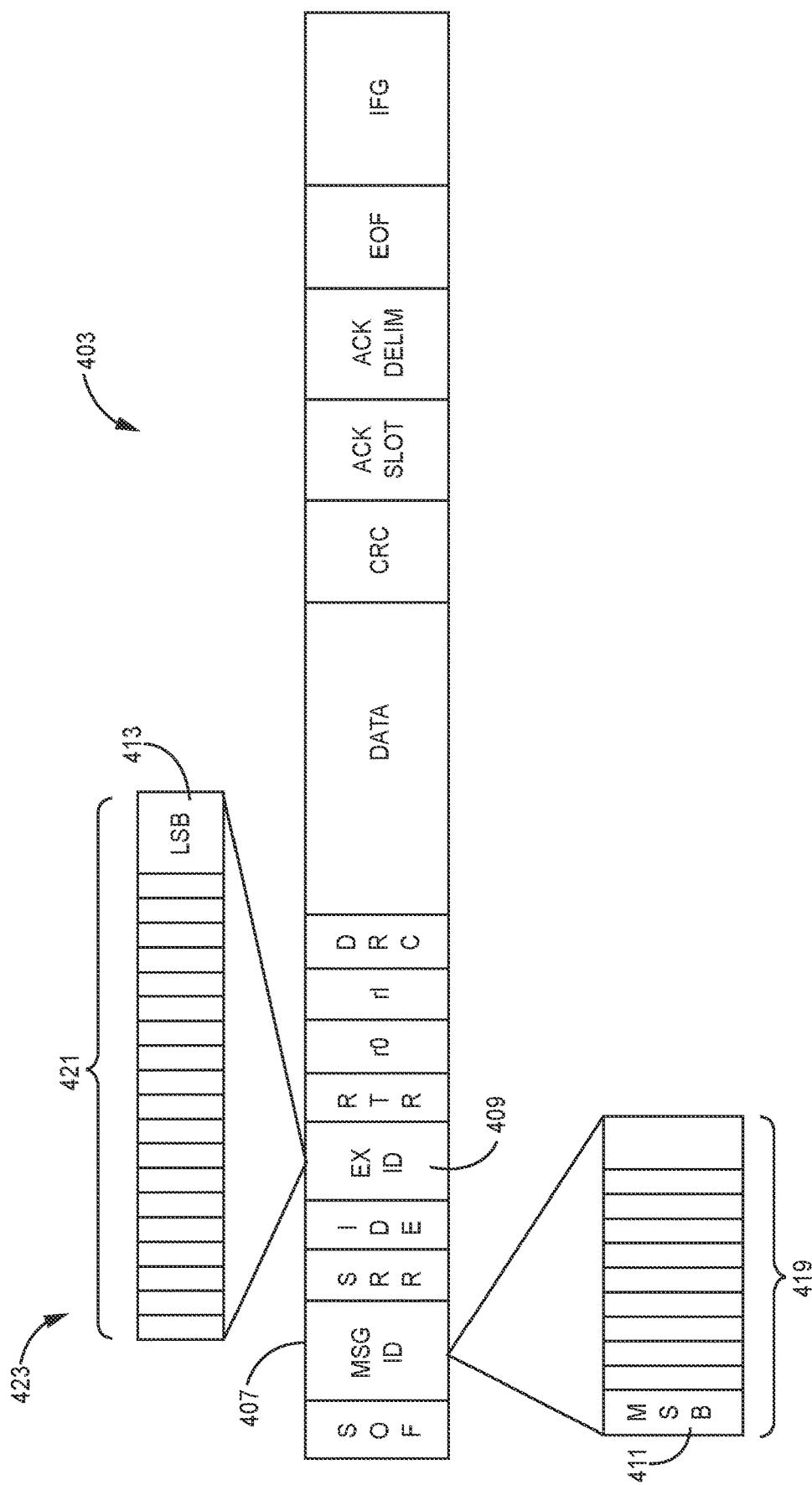
FIG. 4 is a block diagram illustrating a further exemplary message frame according to an aspect of the present disclosure.

FIGS. 3 and 4 are diagrams illustrating formats for message frames 303 and 403 for the communication of data between separate nodes 103 within a BRAIN network 100. The message frame as transmitted from the CAN controller may include a message identification field 307, where the message identification field 307 is a unique identifier for the message that also represents the message priority. However, when the BRAIN circuitry 207 receives the message frame, the BRAIN circuitry 207 may replace the information in the message identification field 307 with BRAIN transmission information 323. For example, as illustrated in FIG. 3, the message identification field 307 may have 11 bits of data, where the most significant bits 311 are received first and the least significant bits 313 are received last. Additionally, the BRAIN transmission information 323 may include a table index value 319 and a hop count 321, where the table index value 319 is transmitted within the most significant bits 311 and the hop count 321 is transmitted within the least significant bits 313. In alternative implementations, the table index value 319 may be transmitted within the least significant bits 313 and the hop count 321 may be transmitted within the most significant bits 311.

FIG. 4 illustrates a message frame 403 having an extended identification field 409. Accordingly, the message identification field 407 may have 11 bits of data and an extended identification field 409 may have 18 bits of data. Thus, the message frame having an extended identification field 409 may provide 29 bits for message identification. In a similar manner to that described above with regards to FIG. 3, the BRAIN circuitry 207 may usurp the method identification fields 407 and 409 by replacing the message identification provided by the CAN controller 203 with BRAIN transmission information 423. As described above, the BRAIN transmission information 423 may include a table index value 419 and a hop count 421, where the table index value 419 is transmitted within the most significant bits 411 of the message identification fields 407 and 409 and the hop count 421 is transmitted within the least significant bits 413. In alternative implementations, the table index value 419 may be transmitted within the least significant bits 413 and the hop count 421 may be transmitted within the most significant bits 411.

In certain embodiments, the table index value 419 may be transmitted within the identification field 407 and the hop count may be transmitted within the extended identification field 409. Alternatively, the table index value 419 may be transmitted within any portion of the identification field 407 and the extended identification field 409. Similarly, the hop count 421 may be transmitted within any portion of the identification field 407 and the extended identification field 409.

In certain embodiments, the BRAIN transmission information 323 and 423 may include a portion of the table index value 319 and 419. For example, in some implementations, the message identification field 307 and/or message identification fields 407 and 409 may not contain sufficient bits to transmit the entire table index value along with the hop count. When there are not enough bits within the message identification field 307 or the message identification fields 407 and 409, the BRAIN circuitry 207 may place a series of least significant bits for the table index value 319 or 419.

In some embodiments, the messages transmitted through the BRAIN network 100 are sequential and table index values are incremented for subsequent messages transmitted through the BRAIN network 100. For example, when transmissions begin between nodes 103 of the BRAIN network 100, the message associated with the beginning of the message index table 219 is transmitted. Each subsequently transmitted message is associated with the next entry in the message index table 219. Accordingly, the table index values 319 and/or 419 may be incremented by one with each subsequently transmitted message. When the transmitted messages and the table index values 319 and/or 419 reach the end of the message index table 219, the transmitted messages and the table index values 319 and/or 419 may go back to the beginning of the message index table 219.

In certain embodiments, the incremental nature of the transmissions of the messages and the associated table index values 319 and/or 419 allows the BRAIN circuitry 207 to insert the least significant bits of the table index values 319 and/or 419 into the message identification field 307 or the message identification fields 407 and 409. For example, if the bottom three bits of the table index value 319 were transmitted, the nodes 103 within the BRAIN network could send eight messages without knowing the complete table index value 319. Accordingly, the different nodes 103 may reconstruct the upper bits of the table index value 319 based on the lower three bits.

In some embodiments, when the BRAIN circuitry 207 places a series of least significant bits for the table index value 319 or 419 in the message identification field 307 or the method identification fields 407 and 409, the BRAIN circuitry 207 may periodically transmit the most significant bits for the table index value 319 or 419. For example, the BRAIN circuitry 207 may periodically transmit the most significant bits in place of the least significant bits. Alternatively, the BRAIN circuitry 207 may transmit the table index value 319 or 419 when communications begin between the different nodes 103 within the BRAIN network 100. After communications begin, the different nodes 103 may be synchronized with one another such that the different nodes 103 may determine the most significant bits of the table index value 319 or 419 from the least significant bits that are transmitted through the messages in the BRAIN transmission information 323 or 423. In some embodiments, the BRAIN circuitry 207 may transmit the least significant bits of the table index value 319 when the BRAIN circuitry 270 usurps an 11 bit message identification field 307 and may transmit the complete table index value 419 when the BRAIN circuitry 270 usurps an 11 bit message identification field 407 and an 18 bit extended method identification field 409.

In implementations, where a portion of the table index value 319 or 419 is transmitted within the message identification fields, at times a node 103 in the BRAIN network 100 may become offline such that the node 103 is either unavailable or unable to transmit or receive messages through the BRAIN network 100. When a node 103 becomes offline, the node 103 may become unsynchronized with the table index values transmitted by the other nodes. As such, when the offline node 103 becomes online and becomes able to communicate with the other nodes 103 within the BRAIN network 100, the node 103 may wait until the other nodes 103 within the BRAIN network 100 transmit the upper bits of the table index value before transmitting a message.

In some embodiments, the BRAIN network 100, when usurping the message identification fields 307 or 407 and 409 may use "bit stuffing" when inserting the BRAIN transmission information 323 or 423. As used herein, bit stuffing may refer to the insertion of a bit of opposite polarity after a certain number of consecutive bits having the same polarity. As called for in the CAN protocol, a bit of opposite clarity may be inserted after five consecutive bits of the same polarity to ensure that there are enough transitions within a message to maintain synchronization. Accordingly, when the BRAIN circuitry 207 inserts the BRAIN transmission information 323 or 423 into the message identification field 300 and or the message identification fields 407 and 409, the BRAIN circuitry 207 may follow the CAN protocol by performing bit stuffing. As the table index values 319 and 419 are sequential, the BRAIN circuitry 207 may possess a priori knowledge about the table index values such that changes to the table index value 319 or 419 due to bit stuffing are easily interpreted by the BRAIN circuitry 207. However, bit stuffing may change the hop count 321 or 421 such that subsequent nodes 103 may be unable to interpret the hop count due to bit stuffing.

In some embodiments, to account for the potential effects of bit stuffing on the hop count 321 or 421, the BRAIN circuitry 207 may ensure that bits associated with the hop count 321 or 421 are not part of five consecutive bits followed by an opposite polarity bit. For example, the hop counts 321 or 421 may be incremented in such a way that they are not part of five consecutive bits followed by an opposite polarity bit. In some implementations, the hop counts 321 or 421 may be incremented using odd parity or using some other technique to limit the number of consecutive bits within the hop counts 321 or 421. Accordingly, the hop counts 321 or 421 within the transmitted messages may be controlled as to not incite bit stuffing.

Figure 5:
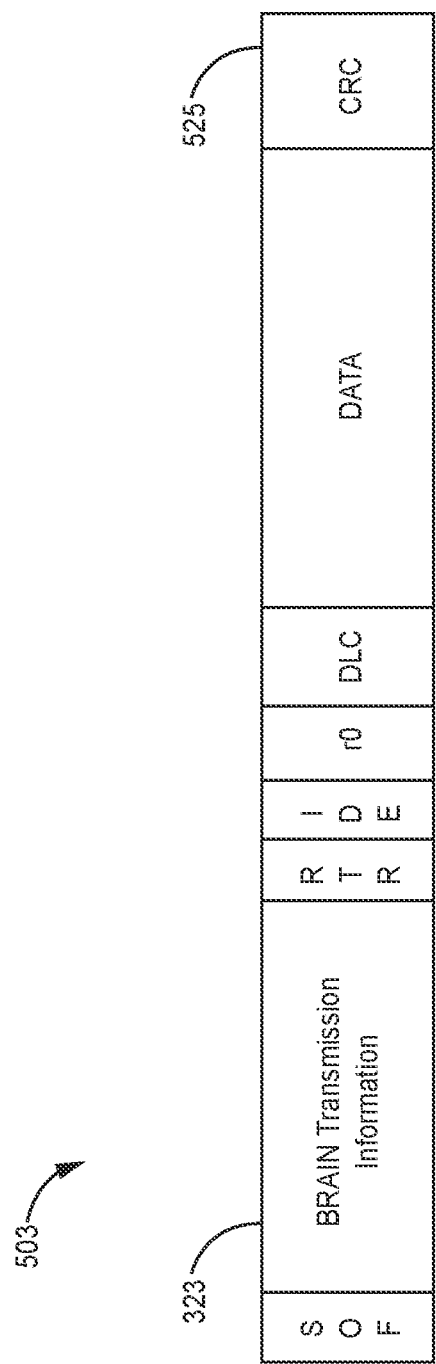
FIG. 5 is a block diagram illustrating an exemplary message frame that is marked as having questionable integrity according to an aspect of the present disclosure.

In certain embodiments, the BRAIN circuitry 207 may check the integrity of the messages received through the different transceivers in the node 103. If the BRAIN circuitry 207 determines that a message does not have the requisite integrity, the BRAIN circuitry may flag the message to indicate that the message is questionable. FIG. 5 is a diagram illustrating a message frame 503 that has been flagged as questionable. When initially transmitted, the message frame 503 was similar to the message frame 303 in FIG. 3, but a node 103 may determine that the message frame 503 had questionable integrity. To mark the message frame 503 as having questionable integrity, a node 103 may truncate the message frame 503 after the cyclical redundancy check field 525. Accordingly, when a node 103 receives a message frame that terminates prematurely with the cyclical redundancy check field 525, the BRAIN circuitry 207 on the receiving node 103 may determine that the message frame 503 has questionable integrity. Alternatively, the BRAIN circuitry 207 may alter data within the message frame to indicate that the message has questionable integrity.

In some implementations, the BRAIN circuitry 207 may determine that a message has questionable integrity when the message received over the skip link and the message received over the near link do not match. Additionally, the BRAIN circuitry 207 may determine that a message has questionable integrity when one of the messages received over the skip link and the near link is marked as having questionable integrity.

As described above, a node 103 that is the ultimate node to receive a message, may receive the message through four different paths from two different directions in the BRAIN network 100. When messages can be flagged as having questionable integrity, the ultimate node 103 may follow certain rules based on the indicated integrity of the four received messages to determine whether or not the node 103 should perform a bit by bit comparison of the four received messages to determine whether or not the data in the receive messages is accurate data. For example, if the node 103 receives two or more messages that are not flagged as having questionable integrity, the node 103 may assume that the data within the messages is identical. However, if three of four messages are marked as having questionable integrity, then the node 103 may perform a bit by bit comparison of the data contained within the messages. Additionally, if messages received from one direction are marked as being questionable and the same message received from the opposite direction is not questionable, then the non-questionable messages received from the opposite direction may be assumed to be accurate.

In certain embodiments, the BRAIN network 100 operates synchronously, where the different nodes 103 step through the message index table 219 synchronously such that the different nodes 103 communicate correctly with their neighboring nodes and their neighbor's neighboring nodes, to avoid collisions. However, the avoidance of collisions cannot be absolutely guaranteed. Particularly, collisions may occur during start-up of the BRAIN network 100 or when a particular node 103 within the BRAIN network 100 loses power and comes back on. In these situations, one or more nodes 103 may not be synchronized with one another and due to the lack of synchronicity, collisions are more likely to occur.

In certain embodiments, when operating isochronously, each of the nodes 103 within the BRAIN network 100 synchronously steps through the message index table 219 and is aware of the direction from which a message was received and the direction to which a message should be transmitted. However, when one or more nodes 103 communicate with other nodes 103 within the BRAIN network 100 asynchronously, such as during start-up or when one or more nodes 103 lose power, the nodes 103 experiencing the collision may arbitrate the collision.

In some embodiments, the CAN controller 203 in the BRAIN circuitry 207 may handle collisions based upon the CAN protocol. When using the CAN protocol to arbitrate collisions, the different nodes 103 within the BRAIN network 100 may sample every bit at the same time. In particular, each node 103 within the BRAIN network 100 may listen to the data being broadcast by both the other nodes 103 in the BRAIN network 100 and to the data broadcast by themselves. If a logical "1" or a recessive bit is transmitted by all transmitting nodes 103 at the same time, then the recessive bit is seen by all the nodes 103, including both the transmitting nodes 103 and the receiving nodes 103. If a logical "0" or a dominant bit is transmitted by all transmitting nodes 103 at the same time, then the dominant bit is seen by all the nodes 103 within the BRAIN network 100. If the dominant bit is transmitted by one or more nodes 103, and the recessive bit is transmitted by one or more nodes 103, then the dominant bit is seen by the nodes 103 including the nodes 103 that transmitted the recessive bit.

When a node 103 transmits the recessive bit but sees the dominant bit transmitted by other nodes 103, the node 103 may realize that a collision has arisen. As used herein, the dominant bit is associated with a logical "0" and the recessive bit is associated with a logical "1". However, the dominant bit may also be associated with a logical "1" and the recessive bit may be associated with a logical "0".

In one or more embodiments, to resolve collisions that arise at one or more nodes 103 within the BRAIN network 100, the nodes 103 that experience the collision may perform an arbitration process to determine which message to send. For example, if a node 103 transmits a recessive bit when another node 103 transmits a dominant bit, the message associated with the recessive bit may lose the arbitration process. In some implementations, when a node 103 loses arbitration, the node 103 that lost the arbitration may re-queue the message for later transmission and the bitstream within the message frame may continue without error until only one node 103 is left transmitting. Accordingly, when multiple nodes 103 or transmitting different messages, the first node 103 that transmits a recessive bit may lose arbitration. Thus, the node 103 having the lowest value in the BRAIN transmission information 323 or 423 may win the arbitration process. In certain embodiments, when a local node 103 loses arbitration at a different node 103, the different node 103 may transmit a dominant least significant bit back to the local node 103 such that the local node 103 is aware that it lost arbitration.

Typically, collisions and the resultant arbitrations occur during startup and possibly when one or more nodes 103 lose power. In the startup situation, when a message is transmitted around the BRAIN network 100 to the nodes 103 within the BRAIN network 100 that instructs the nodes 103 to point to the beginning of the message index table 219. During the transmission of this message, the different nodes 103 may transmit asynchronously, which may cause some or all of the nodes 103 to perform the arbitration process described above. After the message is received by the different nodes 103 and the different nodes 103 are pointing to the beginning of the message index table 219, the different nodes 103 may then transmit messages isochronously.

In some implementations, certain slots within the message index table 219 may be free slots. As used herein, a free slot may indicate to the different nodes 103 that they may transmit a message. However, during this free slot, the different nodes may transmit different messages and resultant collisions may be resolved using the above described arbitration process. The message index table 219 may periodically provide a free slot or free slots may be requested by the nodes 103. Thus, by using one or more free slots within the message index table 219, the BRAIN network 100 may provide a type of controlled asynchrony.

FIG. 6 is block diagram illustrating one example of a type of fault that may occur within the BRAIN network 100. In particular, FIG. 6 illustrates a fault that may be known as a "babbling idiot fault." Babbling idiot faults may occur during the operation of the BRAIN network 100 of FIG. 1 while such nodes 103 are operating in a synchronized mode. In the example shown in FIG. 6, each node 103 in the BRAIN network 100 may include the BRAIN circuitry 207 and function as described above with respect to FIGS. 2-5. In this example, node A has a babbling idiot fault during the time slot in which node E is scheduled to transmit. Due to the fault, node A may experience a collision and may perform the arbitration process. If the repeating message transmitted from node E has a higher priority than the message produced by node A, node A will transmit the repeating message instead of the faulty message. However, if the faulty message produced by node A has a higher priority, then node A will transmit the faulty message.

When transmitting the faulty message, node A may transmit the message to node A's clockwise neighbor node H along channel 0 and to node A's counterclockwise neighbor node B along channel 1. When node H receives from channel 0 the message transmitted by node A, the comparison that node H performs between the message received from node A (node H's counter-clockwise neighbor) and the message received from node B (node H's counter-clockwise neighbor's neighbor) will indicate that the two messages are not identical. As result, node H relays on channel 0 the message received from node A along with information indicating that the message has questionable integrity. Likewise, when node B receives from channel 1 the message transmitted by node A, the comparison that node B performs between the message received from node A (node B's clockwise neighbor) and the message received from node B (node B's clockwise neighbor's neighbor) will indicate that the two messages are not identical. As result, node B relays on channel 1 the message received from node A along with information indicating that the message has questionable integrity.

The links 108 of channel 0 and channel 1 that are affected by node A's transmission of the faulty message are shown in FIG. 6 using dashed lines. The near link 108 in channel 0 from node A to node H and the near and skip links 108 in channel 0 from nodes H to node G, from node G to node F, and from node F to node E are affected by the faulty transmission by node A. The near link 108 in channel 1 from node A to node B and the near and skip links 108 in channel 1 from node B to node C, from node C to node D, and from node D to node E are affected by the faulty transmission by node A.

Data transmitted by node E along channel 0 is received and relayed by nodes D, C, and B because the links 108 in this part of channel 0 are not affected by node A's transmissions. Likewise, data transmitted by node E along channel 1 is received and relayed by nodes F, G, and H because the links 108 in this part of channel 1 are not affected by node A's transmissions. The links 108 of channel 0 and channel 1 that are not affected by node A's transmissions and over which node E is able to transmit successfully are shown in FIG. 6 using solid lines. In this way, data transmitted by node E is able to reach each of the nodes 103 in the ring 104 despite the babbling idiot fault occurring at node A. Further, the destination node 103 for the message may resolve the received messages based on the bit-by-bit comparisons described above.

FIG. 7 is a flowchart illustrating a method 700 for transmitting can messages through a BRAIN network. As shown, the method 700 may proceed at 701 where a message from a CAN controller in a node is received. For example, BRAIN circuitry 207 may receive a message from a CAN controller 203, where the message is formatted according to the CAN protocol. When the message is received from the CAN controller, the method 700 may proceed at 703 where one or more message identification fields in the message are replaced with BRAIN transmission information. As discussed above, a message that is formatted according to the CAN protocol may include one or more message identification fields, such as method identification fields 307, 407, or 409 in FIGS. 3 and 4. The BRAIN circuitry 207 may replace the method identification fields with the BRAIN transmission information, which may include a portion of the table index value and the hop count.

Additionally, when the method identification fields have been replaced with the BRAIN transmission information, the method 700 may proceed at 705, where the message with the BRAIN transmission information is transmitted through a plurality of transceivers to nodes in a BRAIN network. For example, the BRAIN circuitry 207 may transmit the altered message through a first skip transceiver that is coupled to a neighbor's neighbor node 103 in a first direction. The BRAIN circuitry 207 may also transmit the altered message through a first near transceiver coupled to a neighbor node 103 in the first direction. Further, the BRAIN circuitry 207 may transmit the altered message through a second skip transceiver coupled to a neighbor's neighbor node 103 in a second direction. Moreover, the BRAIN circuitry 207 may transmit the altered message through a second near transceiver coupled to a neighbor node 103 in the second direction. Accordingly, the BRAIN circuitry 207 may interface the CAN controller with the BRAIN network 100.

Example Embodiments

Example 1 includes a node comprising: a controller area network (CAN) controller that transmits and receives CAN messages according to CAN protocol; and braided ring availability integrity network (BRAIN) circuitry coupled to the CAN controller, wherein the BRAIN circuitry alters the received CAN messages from the CAN controller for transmission to other nodes within a BRAIN network and alters BRAIN messages received from the other nodes into CAN messages for processing by the CAN controller.

Example 2 includes the node of Example 1, further comprising a BRAIN memory, wherein the BRAIN memory is accessible to the BRAIN circuitry and the BRAIN memory stores a message index table.

Example 3 includes the node of Example 2, wherein the BRAIN circuitry transmits the BRAIN messages by stepping through the message index table.

Example 4 includes the node of any of Examples 1-3, wherein the BRAIN circuitry converts the received CAN messages into the BRAIN messages by replacing one or more CAN message identification fields with BRAIN transmission information.

Example 5 includes the node of Example 4, wherein the BRAIN transmission information includes at least one of: a hop count; and a portion of a message index value.

Example 6 includes the node of Example 5, wherein the portion of the message index value comprises at least one of: the message index value; a group of least significant bits for the message index value; and a group of most significant bits for the message index value.

Example 7 includes the node of any of Examples 1-6, wherein the BRAIN circuitry identifies a BRAIN message as having questionable integrity.

Example 8 includes the node of Example 7, wherein the BRAIN circuitry truncates the BRAIN message having questionable integrity.

Example 9 includes the node of any of Examples 1-8, wherein the BRAIN circuitry transmits and receives BRAIN messages through: a first skip transceiver coupled to a neighbor's neighbor node in a first direction; a first near transceiver coupled to a neighbor node in the first direction; a second skip transceiver coupled to a neighbor's neighbor node in a second direction; and a second near transceiver coupled to a neighbor node in the second direction.

Example 10 includes a network comprising: a plurality of nodes that are communicatively coupled to one another over first and second channels; wherein each node is communicatively coupled to a first neighbor node included in the plurality of nodes via a respective near link in a first direction and to a second neighbor node included in the plurality of nodes via a respective near link in a second direction; wherein each node is communicatively coupled to a first neighbor's neighbor node included in the plurality of nodes via a respective skip link in the first direction and to a second neighbor's neighbor node included in the plurality of nodes via a respective skip link in the second direction; and wherein each node in the plurality of nodes comprises: a controller area network (CAN) controller that transmits and receives CAN messages based on CAN protocol; and braided ring availability integrity network (BRAIN) circuitry coupled to the CAN controller, wherein the BRAIN circuitry converts the received CAN messages into BRAIN messages for transmission to other nodes in the plurality of nodes within a BRAIN network and converts received BRAIN messages from the other nodes into CAN messages for processing by the CAN controller.

Example 11 includes the network of Example 10, wherein each node further comprises a BRAIN memory, wherein the BRAIN memory is accessible to the BRAIN circuitry and the BRAIN memory stores a message index table that indicates which of the BRAIN messages should be transmitted through the network.

Example 12 includes the network of Example 11, wherein a respective BRAIN circuitry on each node in the plurality of nodes steps through the message index table isochronously.

Example 13 includes the network of Example 12, wherein one or more time slots within the message index table allow asynchronous communication between the plurality of nodes.

Example 14 includes the network of any of Examples 12-13, wherein the BRAIN circuitry converts the received CAN messages into the BRAIN messages by replacing one or more CAN message identification fields with BRAIN transmission information.

Example 15 includes the network of Example 14, wherein the BRAIN transmission information includes at least one of: a hop count; and a portion of a message index value, wherein the portion of the message index value comprises at least one of: the message index value; a group of least significant bits for the message index value; and a group of most significant bits for the message index value.

Example 16 includes the network of any of Examples 10-15, wherein the BRAIN circuitry identifies a BRAIN message as having questionable integrity.

Example 17 includes the network of Example 16, wherein a node in the plurality of nodes determines whether to perform a bit-by-bit comparison based on an analysis of received BRAIN messages having questionable integrity from the first neighbor node, the first neighbor's neighbor node, the second neighbor node, and the second neighbor's neighbor node.

Example 18 includes the network of any of Examples 16-17, wherein the BRAIN circuitry within a node truncates the BRAIN message having questionable integrity.

Example 19 includes a method comprising: receiving a controller area network (CAN) message from a CAN controller in a node, wherein the CAN message is formatted according to CAN protocol; replacing one or more message identification fields in the CAN message with braided ring availability integrity network (BRAIN) transmission information at a BRAIN circuitry to create a BRAIN message; and transmitting the BRAIN message with the BRAIN transmission information through: a first skip transceiver coupled to a neighbor's neighbor node in a first direction; a first near transceiver coupled to a neighbor node in the first direction; a second skip transceiver coupled to a neighbor's neighbor node in a second direction; and a second near transceiver coupled to a neighbor node in the second direction.

Example 20 includes the method of Example 19, wherein the BRAIN transmission information includes at least one of: a hop count; and a portion of a message index value, wherein the portion of the message index value comprises at least one of: the message index value; a group of least significant bits for the message index value; and a group of most significant bits for the message index value.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A node comprising:
a controller area network (CAN) controller that transmits and receives CAN messages according to CAN protocol; and
braided ring availability integrity network (BRAIN) circuitry coupled to the CAN controller, wherein the BRAIN circuitry alters the received CAN messages from the CAN controller for transmission to other nodes within a BRAIN network and alters BRAIN messages received from the other nodes into CAN messages for processing by the CAN controller.

2. The node of claim 1, further comprising a BRAIN memory, wherein the BRAIN memory is accessible to the BRAIN circuitry and the BRAIN memory stores a message index table.

3. The node of claim 2, wherein the BRAIN circuitry transmits the BRAIN messages by stepping through the message index table.

4. The node of claim 1, wherein the BRAIN circuitry converts the received CAN messages into the BRAIN messages by replacing one or more CAN message identification fields with BRAIN transmission information.

5. The node of claim 4, wherein the BRAIN transmission information includes at least one of:
a hop count; and
a portion of a message index value.

6. The node of claim 5, wherein the portion of the message index value comprises at least one of:
the message index value;
a group of least significant bits for the message index value; and
a group of most significant bits for the message index value.

7. The node of claim 1, wherein the BRAIN circuitry identifies a BRAIN message as having questionable integrity.

8. The node of claim 7, wherein the BRAIN circuitry truncates the BRAIN message having questionable integrity.

9. The node of claim 1, wherein the BRAIN circuitry transmits and receives BRAIN messages through:
a first skip transceiver coupled to a neighbor's neighbor node in a first direction;
a first near transceiver coupled to a neighbor node in the first direction;
a second skip transceiver coupled to a neighbor's neighbor node in a second direction; and
a second near transceiver coupled to a neighbor node in the second direction.

10. A network comprising:
a plurality of nodes that are communicatively coupled to one another over first and second channels;
wherein each node is communicatively coupled to a first neighbor node included in the plurality of nodes via a respective near link in a first direction and to a second neighbor node included in the plurality of nodes via a respective near link in a second direction;
wherein each node is communicatively coupled to a first neighbor's neighbor node included in the plurality of nodes via a respective skip link in the first direction and to a second neighbor's neighbor node included in the plurality of nodes via a respective skip link in the second direction; and
wherein each node in the plurality of nodes comprises:
a controller area network (CAN) controller that transmits and receives CAN messages based on CAN protocol; and
braided ring availability integrity network (BRAIN) circuitry coupled to the CAN controller, wherein the BRAIN circuitry converts the received CAN messages into BRAIN messages for transmission to other nodes in the plurality of nodes within a BRAIN network and converts received BRAIN messages from the other nodes into CAN messages for processing by the CAN controller.

11. The network of claim 10, wherein each node further comprises a BRAIN memory, wherein the BRAIN memory is accessible to the BRAIN circuitry and the BRAIN memory stores a message index table that indicates which of the BRAIN messages should be transmitted through the network.

12. The network of claim 11, wherein a respective BRAIN circuitry on each node in the plurality of nodes steps through the message index table isochronously.

13. The network of claim 12, wherein one or more time slots within the message index table allow asynchronous communication between the plurality of nodes.

14. The network of claim 12, wherein the BRAIN circuitry converts the received CAN messages into the BRAIN messages by replacing one or more CAN message identification fields with BRAIN transmission information.

15. The network of claim 14, wherein the BRAIN transmission information includes at least one of:
a hop count; and
a portion of a message index value, wherein the portion of the message index value comprises at least one of:
the message index value;
a group of least significant bits for the message index value; and
a group of most significant bits for the message index value.

16. The network of claim 10, wherein the BRAIN circuitry identifies a BRAIN message as having questionable integrity.

17. The network of claim 16, wherein a node in the plurality of nodes determines whether to perform a bit-by-bit comparison based on an analysis of received BRAIN messages having questionable integrity from the first neighbor node, the first neighbor's neighbor node, the second neighbor node, and the second neighbor's neighbor node.

18. The network of claim 16, wherein the BRAIN circuitry within a node truncates the BRAIN message having questionable integrity.

19. A method comprising:
- receiving a controller area network (CAN) message from a CAN controller in a node, wherein the CAN message is formatted according to CAN protocol;
- replacing one or more message identification fields in the CAN message with braided ring availability integrity network (BRAIN) transmission information at a BRAIN circuitry to create a BRAIN message; and
- transmitting the BRAIN message with the BRAIN transmission information through:
  - a first skip transceiver coupled to a neighbor's neighbor node in a first direction;
  - a first near transceiver coupled to a neighbor node in the first direction;
  - a second skip transceiver coupled to a neighbor's neighbor node in a second direction; and
  - a second near transceiver coupled to a neighbor node in the second direction.

20. The method of claim 19, wherein the BRAIN transmission information includes at least one of:
- a hop count; and
- a portion of a message index value, wherein the portion of the message index value comprises at least one of:
  - the message index value;
  - a group of least significant bits for the message index value; and
  - a group of most significant bits for the message index value.

* * * * *